UNITED STATES PATENT OFFICE.

GUSTAV SCHULTZ, OF MUNICH, GERMANY.

PROCESS OF NITRATING SOLVENT NAPHTHA.

No. 898,144. Specification of Letters Patent. Patented Sept. 8, 1908.

Application filed October 3, 1907. Serial No. 395,775.

*To all whom it may concern:*

Be it known that I, GUSTAV SCHULTZ, professor and doctor, subject of the King of Bavaria, residing at 3 Gisclastrasse, Munich, Bavaria, Germany, have invented new and useful Improvements in Processes of Nitrating Solvent Naphtha, of which the following is a specification.

It is well known that the so called solvent naphtha,—heretofore used as a dissolving agent for various purposes, which is obtained from coal-tar oil,—after the removal therefrom of the acid and basic components by alternate treatment with alkalies and acids, and after the removal of the bodies contained in it which become resinous with sulfuric acid, (such as styrole, cumaron, inden and similar compounds), produces a liquid which consists for the greater part of hydrocarbons of the aromatic series, especially of xylol, ethylbenzol, pseudocumol, mesitylene and a few compounds not yet clearly defined.

There can be obtained in the market various kinds of solvent naphtha, a few of which have a low boiling point, and which contain toluol besides the above named bodies, while others containing those bodies contain also hydrocarbons having higher boiling points.

The object of the present invention is to produce from solvent naphtha by nitration, mixtures of nitro-compounds of the hydrocarbons contained in the said solvent naphtha, and especially from such as have a boiling point of about 120 degrees to 180 degrees centigrade, and which have been well washed with sulfuric acid; as it has been found that these nitro-compounds are especially well suited for the production of highly effective safety explosives.

It may be stated that raw impure tar oil or raw solvent naphtha has already been nitrated. But the process heretofore employed has no technical value, because these raw oils are very easily attacked and destroyed by nitric acid, and easily resinate with sulfuric acid. In consequence of this vulnerability there occur violent reactions on nitration with a mixture of nitric and sulfuric acids which destroy the greater part of the tar oils, so that only small yields of nitro-compounds contaminated with various by-products are obtained and which compounds are quite unsuitable for the production of safety explosives on account of their impurity.

In the present invention the solvent naphtha employed as the raw material is by thorough treatment with soda and sulfuric acid, first freed from the basic products, acid oils, pyridin bases, and easily resinated bodies, which are valueless for the intended purpose; and is then purified by repeated distillation, and finally yields a liquid as clear as water, and the boiling point thereof lies between 120 degrees and 180 degrees C. and it has a specific gravity of about 0.860 to 0.875 at 15 degrees C. If such a solvent naphtha is nitrated in the manner to be hereinafter described, a product is at last obtained which forms a mixture of solid crystalline substances with oily liquids. While the solid crystalline bodies mainly consist of highly nitrated xylene, highly nitrated ethylbenzol, nitrated pseudocumol and mesitylene, and also nitrated toluol, the above-mentioned oily liquids are in all probability likewise highly nitrated products of those above mentioned compounds contained in the solvent naphtha which have not yet been characterized.

It has been proved that both the solid and the oily nitro-products are suitable for the production of safety explosives, but that according to whether the solid only, the oily only, or mixtures of the nitro-compounds are employed, explosives of various shattering power are obtained and therefore the nitrating process about to be described is so conducted that according to the desired object, the solid only, the oily only or various mixtures of them are obtained. In order to effect this, the solvent naphtha is either nitrated as it is, or it is separated into two or three fractions, by fractional distillation, each of which fractions is subjected by itself to nitration. If the solvent naphtha is nitrated as it is, a mixture of solid and oily nitro-compounds is obtained. But if the solvent naphtha is separated by distillation into, for example, three fractions, the first of which boils at 120 degrees to 140 degrees, the second at 140 degrees to 160 degrees, and the third at 160 degrees to 180 degrees centigrade, each of said fractions is nitrated by itself, the first yields exclusively solid nitro products; the second for the greater part oily nitro products mixed with solid; and the third for the greater part solid crystalline nitro products. These bodies are highly nitrated products in the first case; with hydrocarbons of lowest boiling points such as xylol, and ethylbenzol, in the second case, with hydrocarbons of medium boiling points not yet identified; and in the third case, nitro-compounds of the materials contained in the solvent naphtha which have the highest boiling points, such as pseudocumol and mesitylene. It is clear that if the solvent naphtha, instead of being separated into three fractions, is decomposed into two only, for example, into one that boils at 120 degrees to 140 degrees and the other at 140 degrees to 180 degrees; or into one the boiling point of which lies at 120 degrees to 160 degrees and the other that boils at 160 degrees to 180 degrees C., mixtures are obtained which contain various solid nitro-compounds with oily ones, and by the use of these, explosives exhibiting other properties can be produced, as, for example, those that are obtained when either only those solid nitro-compounds resulting from the first or third fraction are employed; or only those oily ones resulting from the second fraction; or again, mixtures of the three sorts of the same which are obtained when the solvent naphtha is nitrated as it is. But the known methods of nitration of the aromatic hydrocarbons are not suitable for the nitration of solvent naphtha. These, and also their separate fractions, are a mixture of various hydrocarbons which behave in various ways when treated with a mixture of nitric and sulfuric acids. If therefore the solvent naphtha, or its separate fractions, is or are nitrated in the usual way, the hydrocarbons contained in the solvent naphtha are partly destroyed by oxidation and partly sulfonated so that finally, instead of the nitro-compounds, mixtures of them with nitro- and sulfo-compounds are obtained that are difficult to separate, and the only useful nitro-compounds therein are not in a pure condition, and can only be isolated by costly and prolonged operations with a very small yield. It is therefore necessary to proceed in the following way and without regard to whether the solvent naphtha is submitted to nitration as it is or in separate fractions.

The nitrating acid consists of 65 parts by volume of nitric acid of 1.49 to 1.52 specific gravity, and 13.5 parts by volume of sulfuric acid of 1.84 specific gravity. Into 60 liters of such nitrating acid are allowed to run 30 liters of solvent naphtha, or of one of its above mentioned fractions, while being vigorously agitated and cooled at 25 degrees C. 60 liters of nitrating acid are now added during vigorous agitation, then the mixture is slowly heated to 80 degrees centigrade and then while agitated, cooled to 25 degrees C. The acid is then removed and the only products formed is again nitrated by the addition of 60 liters of fresh acid mixture as above specified and 45 litres of sulfuric acid of 1.84 specific gravity, while the temperature is again allowed to rise to 80 degrees centigrade and then cooled as before to 25 degrees C. and finally the acid is drawn off. This latter can afterwards be used in a fresh operation as preliminary nitration acid, that is to say, for the first nitration. The product freed from the acid, is, according to whether the whole solvent naphtha or a separate fraction thereof has been nitrated, either half solid, solid, or oily. It is then well washed with water. The solid products may be used direct for the production of explosives; the half solid products are subjected to pressure whereby liquid nitro-products run off as oil; and a solid residue is left which can be further purified by boiling with alcohol.

Having described my invention what I claim as new and desire to secure by Letters Patent thereon is:

1. The process of producing a mixture of aromatic nitro-compounds from purified solvent naphtha, consisting in preliminarily nitrating the naphtha by mixing it with the described mixture of nitric and sulfuric acids; and then simultaneously cooling and agitating the same; then separating the mixed acids from the partially nitrated naphtha; completing the nitration of the latter with a fresh acid mixture containing a greater relative proportion of sulfuric acid than the first mixture, and cooling as before, and finally removing the mixed acids from the nitrated naphtha and washing the latter with water substantially as described.

2. The process of producing a mixture of aromatic nitro-compounds from purified solvent naphtha as hereinbefore specified having a boiling point of 120 degrees to 180 degrees C., consisting in preliminarily nitrating the naphtha by agitating it with the described mixture of nitric and sulfuric acids, slowly heating the mixture, simultaneously cooling and agitating the same, separating the mixed acids from the partially nitrated naphtha, completing the nitration of the latter with a fresh acid mixture as described containing a greater relative proportion of sulfuric acid than the first, while heating and cooling as before, removing the mixed acids from the nitrated naphtha and washing the latter with water substantially as described.

3. The process of producing a mixture of aromatic nitro-compounds from purified solvent naphtha as hereinbefore specified having a boiling point of 120 degrees to 180 degrees C., consisting in preliminarily nitrating the naphtha by agitating it with the described mixture of nitric and sulfuric acids while cooling the mixture, then heating and afterward cooling the mixture, separating the residual mixed acids from the partially nitrated naphtha, completing the nitration of the latter with a fresh mixture of nitric and sulfuric acids containing a greater relative proportion of sulfuric acid than the first while heating and cooling as before, separating the resulting mixture of solid and liquid nitro-compounds from the residual acids and washing the nitro-compounds with water.

In testimony whereof I have signed my name to this specification in the presence of two subscribing witnesses.

GUSTAV SCHULTZ.

Witnesses:
MAURICE LILIENFELD,
EMIL PAPENBRUCH.